Figure 1:
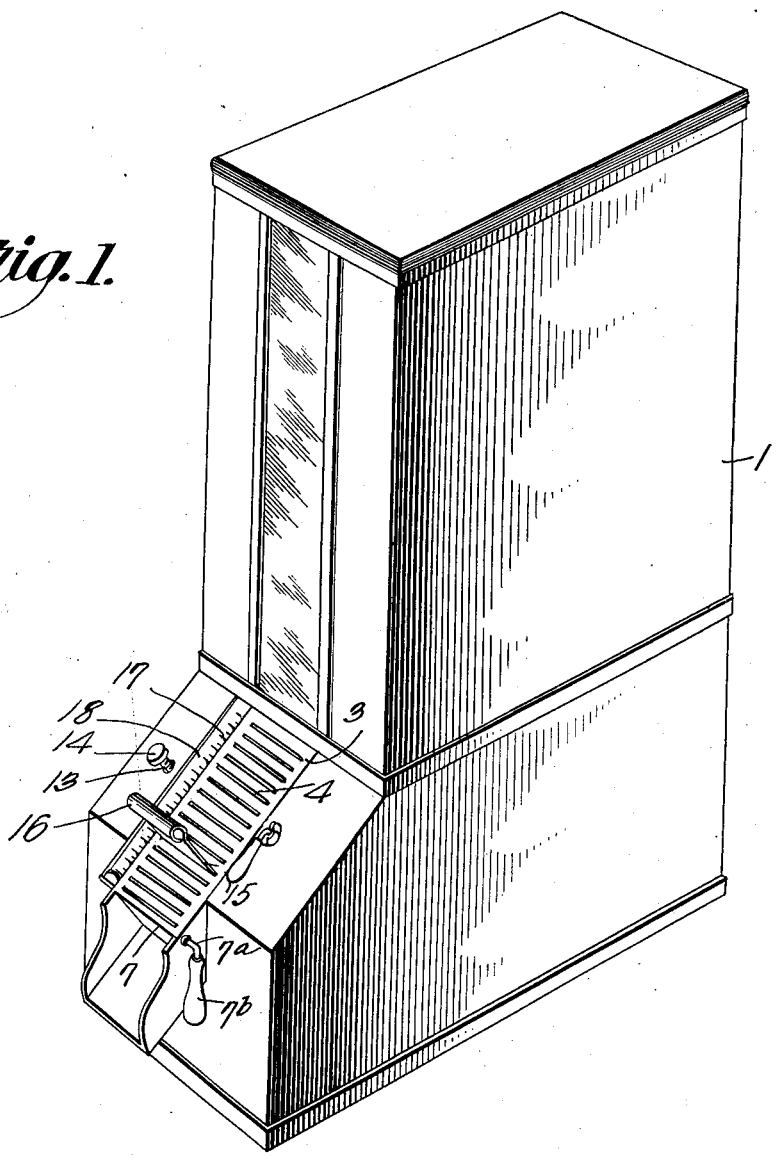

L. B. THOMAS.
MEASURING AND DISPENSING BIN.
APPLICATION FILED AUG. 3, 1912.

1,095,245.

Patented May 5, 1914.
2 SHEETS—SHEET 1.

Witnesses

Luther B. Thomas, Inventor
by C. A. Snow & Co., Attorneys

L. B. THOMAS.
MEASURING AND DISPENSING BIN.
APPLICATION FILED AUG. 3, 1912.
1,095,245.
Patented May 5, 1914.
2 SHEETS—SHEET 2.
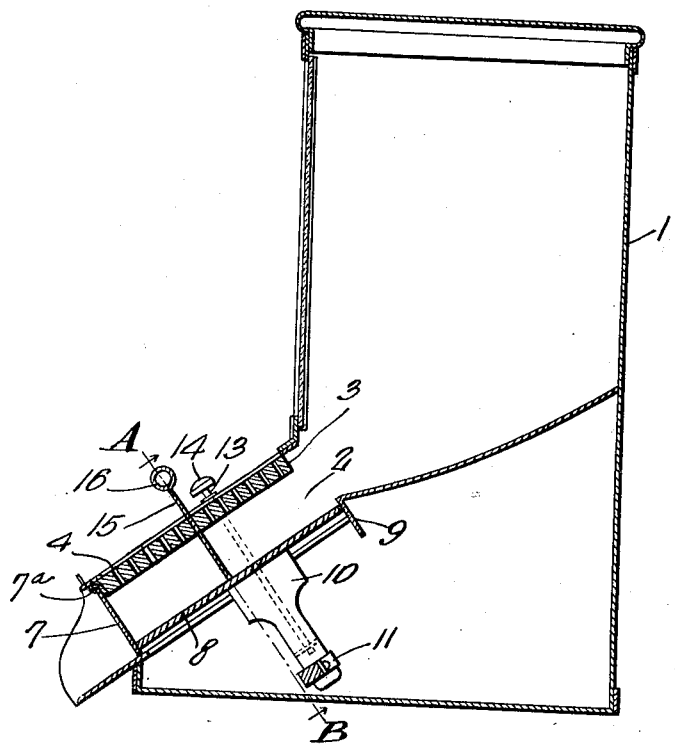
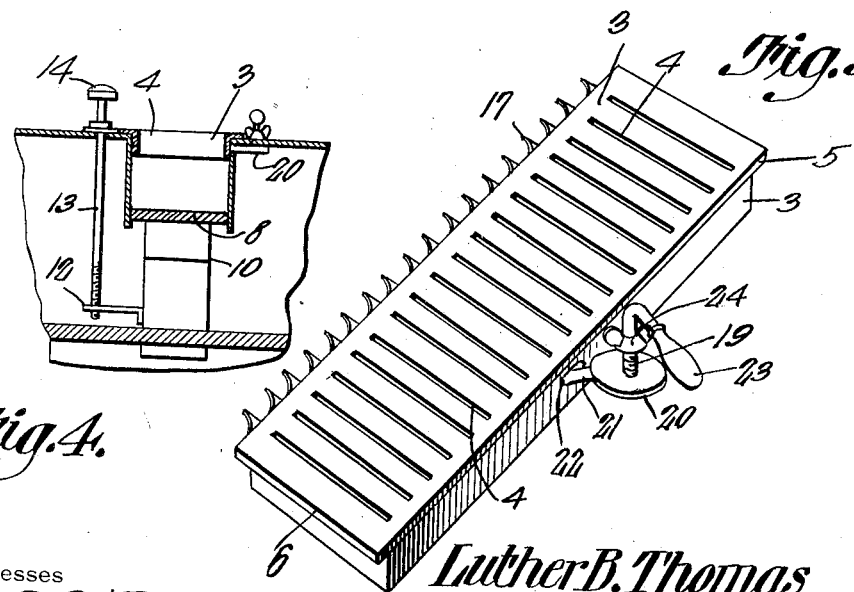
Witnesses
Luther B. Thomas, Inventor
by C. A. Snow & Co., Attorneys

UNITED STATES PATENT OFFICE.

LUTHER B. THOMAS, OF SHREVEPORT, LOUISIANA, ASSIGNOR OF ONE-TENTH TO J. M. ROBINSON, OF BAYOU LA CHUTE, LOUISIANA.

MEASURING AND DISPENSING BIN.

1,095,245.  Specification of Letters Patent.  Patented May 5, 1914.

Application filed August 3, 1912. Serial No. 713,162.

*To all whom it may concern:*

Be it known that I, LUTHER B. THOMAS, a citizen of the United States, residing at Shreveport, in the parish of Caddo and State of Louisiana, have invented a new and useful Measuring and Dispensing Bin, of which the following is a specification.

This invention relates to measuring and dispensing bins, one of its objects being to provide a bin having a measuring compartment the transverse area of which can be regulated readily, said measuring compartment having a slotted wall for the reception of a novel form of cut-off.

Another object is to provide a structure of this type which is simple and inexpensive and whereby any desired quantity of material can be quickly measured and subsequently discharged.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of a pin constructed in accordance with the present invention. Fig. 2 is a vertical longitudinal section therethrough. Fig. 3 is perspective view on an enlarged scale of the closure for the top of the measuring compartment. Fig. 4 is a transverse section on the line A—B Fig. 2.

Referring to the figures by characters of reference 1 designates the casing of the bin, the same discharging, at its bottom, into an inclined measuring compartment 2 which is open at its ends. The top of the measuring compartment is adapted to be closed by a fixed plate 3 having parallel transversely extending slots 4 and extending along the edges of the plate are outstanding supporting flanges 5 adapted to bear downwardly on the top of the compartment 2 so as thus to support the plate 3 within the top of the compartment. One of the ends of the plate 3 has an apron 6 extending therefrom and this apron is designed to overhang a closure 7 which is supported in the lower end portion of the compartment 2 and beyond the lower end of the plate 3, this closure being secured to a rod 7ª which extends transversely of and is supported by the walls of the compartment 2. A handle 7ᵇ is secured to the rod 7ª and constitutes a weight for maintaining the closure 7 normally in a predetermined position. The measuring compartment is provided with an adjustable bottom 8 located between the closure 7 and a depending end wall 9 located at the outlet of the bin 1. This bottom 8 is secured upon a slide 10 mounted within a transverse guide 11 and a bracket 12 extends laterally from the slide and is engaged by the threaded end of an adjusting screw 13 which projects upwardly through the casing at one side of the measuring compartment 2 and has a head 14 whereby it can be rotated conveniently for the purpose of raising or lowering the slide and the bottom 8 secured thereto.

A cut-off plate 15 is adapted to be inserted into any one of the slots 4 so as to extend throughout the height and width of the measuring compartment 2. This plate has an enlarged upper end portion 16 constituting a handle whereby it can be easily grasped and manipulated.

Pointers 17 extend laterally from the plate opposite the ends of slots 4 and are adapted to indicate graduations formed on a strip 18 secured on the casing of the bin and close to and at one side of the measuring compartment. This strip 18 can be removed and another one substituted therefor, one strip being provided for each kind of material to be dispensed and said strip being adapted to indicate not only the quantity, but the price.

A shaft 19 is mounted for rotation in the casing of the bin at one side of the measuring compartment and has a disk 20 at its lower end from which extends a radial arm 21. This arm projects loosely into a recess or opening 22 in one side of the plate 3. A handle extends radially from the upper portion of the shaft 19 and threaded on said shaft is a wing nut 24 or the like adapted to bind on the top of the bin casing so as to draw the disk 20 tight against the lower surface of said top. When the parts are thus clamped together, shaft 19 is of course held against rotation. It will be apparent that by rotating shaft 19, arm 21 can be caused to swing and thus shift the plate 3 toward or away from the inlet end of the measuring compartment 2. This adjustment of the plate is desirable for the reason that the pointers can thus be shifted so as to register with any one of the adjacent graduations on the strip 18.

It is to be understood of course that the measuring compartment is constantly in communication with the interior of the bin 1 and is thus always full of material, the closure 7 preventing the material from leaving the measuring compartment. The slots in the plate 3 normally define units of measure. For example, should it be desired to measure one pound of the material, the cut-off plate 15 is inserted in the slot 4 opposite the graduations designated by "1 lb." and this cut-off plate, when inserted into the measuring compartment, divides the contents of the compartment into two portions. The closure 7 is then swung open and that portion of the material below the cut-off plate 15 will gravitate from the measuring compartment and will be found to weigh one pound. If, however, it is desired to get 1 lb. 2 ounces of material, the plate 3 is shifted bodily so as to move the slot in which plate 15 is located, bodily, thereby to bring it down past the "1 lb." graduation and to a graduation indicating two additional ounces. Thus it will be seen that the plate need not be moved for getting ordinary amounts. This is only done when small fractions are to be added to any of the amounts normally indicated by the slots. The same operation can be carried out for getting other weights of material. It is of course to be understood that the bottom 8 is adjusted toward or from the plate 3 so that the amounts of material confined will be equal to the weight indicated when the cut-off plate 15 is inserted into the measuring compartment.

What is claimed is:—

1. The combination with a measuring compartment, a bin opening thereinto, a closure at the outlet end of the measuring compartment, and a fixed graduated scale adjacent the compartment, of a plate having a series of transverse slots and constituting one wall of the compartment, said slots normally registering with those graduations on the scale indicating units of measure, means for shifting the plate longitudinally to bring each slot into register with any one of the adjacent graduations indicating fractions of units of measure, pointers extending laterally from the plate, one pointer being located adjacent the end of each slot, and a cut-off device insertible into any one of the slots, to confine within the compartment and between the closure and the cut-off the amount of material indicated by the graduation with which said slot and its pointer register.

2. The combination with a measuring compartment, a closure at the outlet end thereof, and a scale at one side of the closure and adjacent the compartment, said scale being graduated to indicate units of measure and fractions thereof, of a plate constituting one wall of the compartment and having a series of transverse slots, there being a recess in one side of the plate, pointers extending from the plate and normally registering with those graduations indicating units of measure, means for shifting the plate longitudinally to bring the pointers into register with graduations indicating fractions of units of measure, said means including a disk, a radial arm thereon projecting into the recess in the plate, a shaft extending from the disk and above the plate, and an actuating means secured to the shaft, means for securing the shaft against rotation and a cut-off plate insertible into any one of the slots and coöperating with the closure to confine within the compartment an amount of material equal to that indicated by the graduation opposite one of the pointers.

In testimony that I claim the foregoing as my own, I have hereto affixed my signature in the presence of two witnesses.

LUTHER B. THOMAS.

Witnesses:
W. C. LANING,
G. W. HAYS.